United States Patent [19]

Asai et al.

[11] Patent Number: 4,852,673
[45] Date of Patent: Aug. 1, 1989

[54] WEIGHING APPARATUS WITH RADIO INTERFERENCE PROTECTION

[75] Inventors: Yoshiharu Asai; Shinji Tsukamoto; Shuji Murata, all of Shiga, Japan

[73] Assignee: Ishida Scales Mfg. Co., Ltd., Kyoto, Japan

[21] Appl. No.: 225,837

[22] Filed: Jul. 29, 1988

[30] Foreign Application Priority Data

Aug. 1, 1987 [JP] Japan .................. 62-193417

[51] Int. Cl.$^4$ ................ G01G 13/00; G01G 3/14
[52] U.S. Cl. ...................... 177/25.18; 177/211
[58] Field of Search .................... 177/211, 25.18

[56] References Cited

U.S. PATENT DOCUMENTS 4,051,721 10/1977 Williams .................. 177/210 C
4,441,569 4/1984 Sashiki et al. ............. 177/211

FOREIGN PATENT DOCUMENTS 60-120222 6/1985 Japan .

Primary Examiner—George H. Miller, Jr.
Attorney, Agent, or Firm—Staas & Halsey

[57] ABSTRACT

A region where a load cell and a weighing hopper or a scale plate are coupled to each other is surrounded by a radio wave inhibiting member. When a weighing apparatus is used in a place subjected to extraneous radio waves of a high electric field intensity, and a high-frequency voltage is induced in the weighing hopper or the scale plate which serves as an antenna, the radio wave inhibiting member prevents a high-frequency current produced by the high-frequency voltage from flowing into the load cell. Therefore, the weighing apparatus is completely protected against any weighing errors which would otherwise result from radio interference with the load cell.

6 Claims, 5 Drawing Sheets

| Frequency (MHZ) | Display value (g) with no radio inteference protection g | Display value (g) with radio wave inhibitor of ferrite g |
|---|---|---|
| 1 0 | 0 | 0 |
| 2 0 | 0 | 0 |
| 3 0 | 0 | 0 |
| 4 0 | 0 | 0 |
| 5 0 | 0 | 0 |
| 6 0 | 0 | 0 |
| 7 0 | 0 | 0 |
| 8 0 | 0 | 0 |
| 9 0 | 0.1 | 0 |
| 1 0 0 | 0.1 | 0 |
| 1 1 0 | 2.4 | 0 |
| 1 2 0 | 1.0 | 0 |
| 1 3 0 | 0.2 | 0 |
| 1 4 0 | 0 | 0 |
| 1 5 0 | 0 | 0 |

Note 1: Electromagnetic field had an intensity of 1v/m.
Note 2: The displayed values were displayed on the weighing apparatus tested.

FIG. 4

| Frequency (MHZ) | Display value (g) with no radio inteference protection g | Display value (g) with radio wave inhibitor of ferrite g |
|---|---|---|
| 10 | 0 | 0 |
| 20 | 0 | 0 |
| 30 | 0 | 0 |
| 40 | 0 | 0 |
| 50 | 0 | 0 |
| 60 | 0 | 0 |
| 70 | 0 | 0 |
| 80 | 0 | 0 |
| 90 | 0.1 | 0 |
| 100 | 0.1 | 0 |
| 110 | 2.4 | 0 |
| 120 | 1.0 | 0 |
| 130 | 0.2 | 0 |
| 140 | 0 | 0 |
| 150 | 0 | 0 |

Note 1: Electromagnetic field had an intensity of 3v/m.
Note 2: The displayed values were displayed on the weighing apparatus tested.

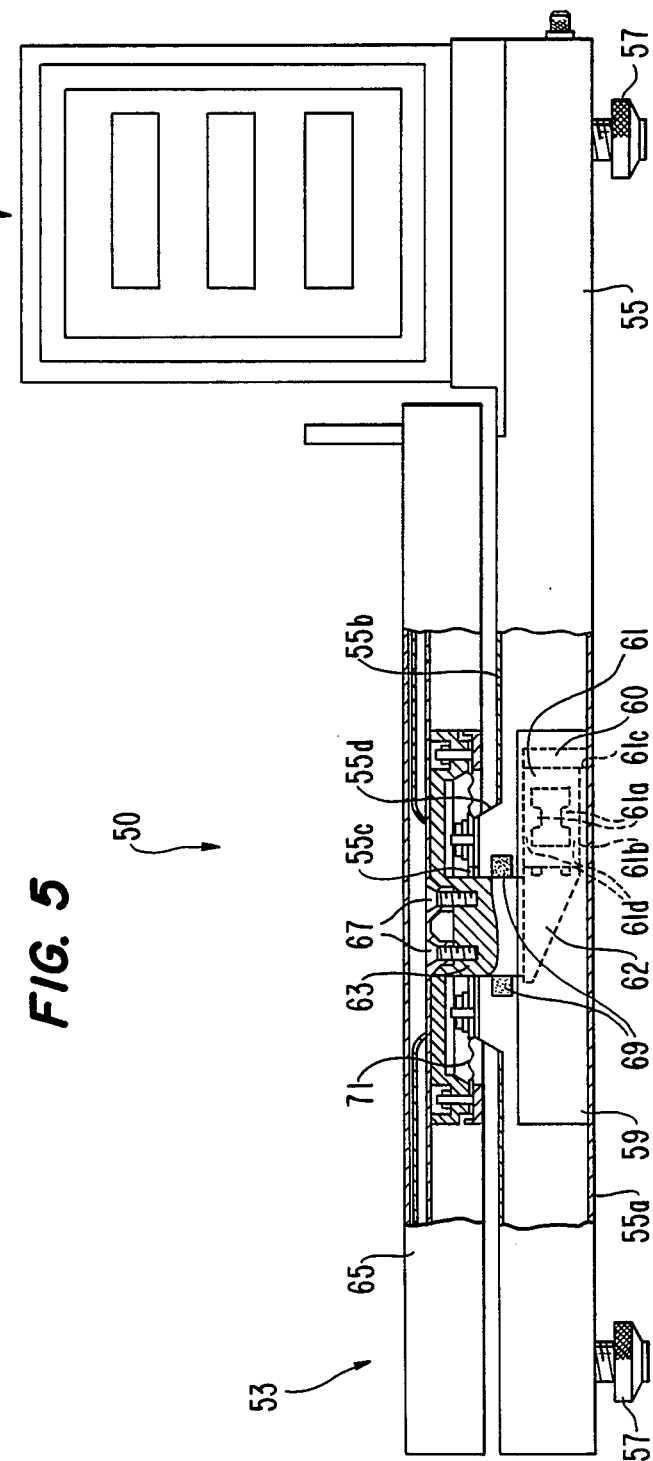

WEIGHING APPARATUS WITH RADIO INTERFERENCE PROTECTION

BACKGROUND OF THE INVENTION (1) Field of the Invention

The present invention relates to a weighing apparatus having a means for preventing interfering radio waves from entering an electronic device in the weighing apparatus.

(2) Description of the Prior Art

Combinatorial weighing apparatus of the prior art operate by supplying articles to be weighed to a plurality of weighing machines, combining weight values measured by the weighing machines into a number of weight combinations, comparing the weight combinations with a given weight, selecting a weight combination which is the same as or closest to the given weight, and discharging the articles from those weighing machines which give the selected weight combination.

Each of the weighing machines has a weighing hopper into which articles are charged and a load detector coupled to the weighing hopper. The load detector generally consists of a load cell having strain gages, and an amplifier including semiconductor devices such as diodes and a highly sensitive operational amplifier for amplifying a weak weight signal produced by the load cell.

Recently, an electronic weighing apparatus including a single scale plate and a display unit positioned adjacent to the scale plate for displaying the weight of an article of merchandise placed on the scale plate and also other items of information such as the name, the unit price, and the price of the article by using data items which are entered beforehand, have been used. The electronic weighing apparatus also has a load detector, which may be the same as the load detector in the combinatorial weighing apparatus, disposed below the scale plate.

Various radio waves in a wide frequency range are propagated in space. Such radio waves enter the amplifiers in the weighing machines through the weighing hoppers and scale plates. These weighing hoppers and scale plates act as an antenna, and the radio waves may be detected by a nonlinear portion in the amplifier and added to the weak weight signal thereby causing an error in the operation of the weighing apparatus. Other interfering radio waves such as sharp radio wave pulses generated by an automobile ignition system or the like also tend to interfere with the operation of the amplifier through the weighing hoppers and the scale plates, causing the weighing apparatus to malfunction.

To solve the above problem, Japanese Laid-Open Patent Publication No. 60-120222 discloses insulation interposed between a weighing hopper and a load cell for protection against radio interference. However, since the weighing hopper and the load cell are insulated from each other in a DC manner, a triboelectric charge developed by friction between an article being weighed and the weight hopper cannot be discharged to ground. The insulation between the weighing hopper and the load cell serves as a capacitor which allows a high-frequency signal induced by the weighing hopper to flow through the capacitor toward the amplifier, which may then fail to operate normally.

SUMMARY OF THE INVENTION

It is an object of the present invention to provide a weighing apparatus having means for protecting a weighing operation against malfunctioning even when radio waves are applied to and radio wave noise is induced in weighing hoppers and scale plates.

Another object of the present invention is to provide a weighing apparatus having a plurality of weighing machines and means for protecting a weighing operation against malfunctioning even when radio waves are applied to and radio wave noise is induced in weighing hoppers of the weighing machines.

Still another object of the present invention is to provide a weighing apparatus having a single scale plate and a display unit disposed adjacent thereto, the weighing apparatus including means for protecting a weighing operation against malfunctioning even when radio waves are applied to and radio wave noise is induced in the scale plate.

To accomplish the aforesaid objects, there is provided a weighing apparatus for measuring the weight of an article, having a load cell having strain generating means for detecting a weight signal indicative of the weight of the article. The weight signal from the load cell is amplified by an amplifier. An article holding member of a metallic material, such as a weighing hopper or a scale plate, is coupled to the load cell. A radio wave inhibiting member made of a magnetic material having a high magnetic permeability is disposed continuously around a region where said load cell and said article holding member are coupled to each other.

Since the radio wave inhibiting member, which is of a ring shape, is disposed in surrounding relation to the region where the load cell and the weighing hopper or the scale plate are coupled to each other, even if the weighing hopper or the scale plate, serving as an antenna, picks up extraneous radio waves which induce a high-frequency voltage therein, such a high-frequency voltage is prevented, by the radio wave inhibiting member, from adversely affecting the load cell.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a table showing the results of a test performed on the weighing apparatus of the invention and a weighing apparatus placed in an electromagnetic field with no ratio interference protection; and FIG. 5 is a partial cross-section elevational view of an electronic weighing apparatus according to another embodiment of the present invention.

DESCRIPTION OF THE PREFERRED EMBODIMENTS

Figure 1:
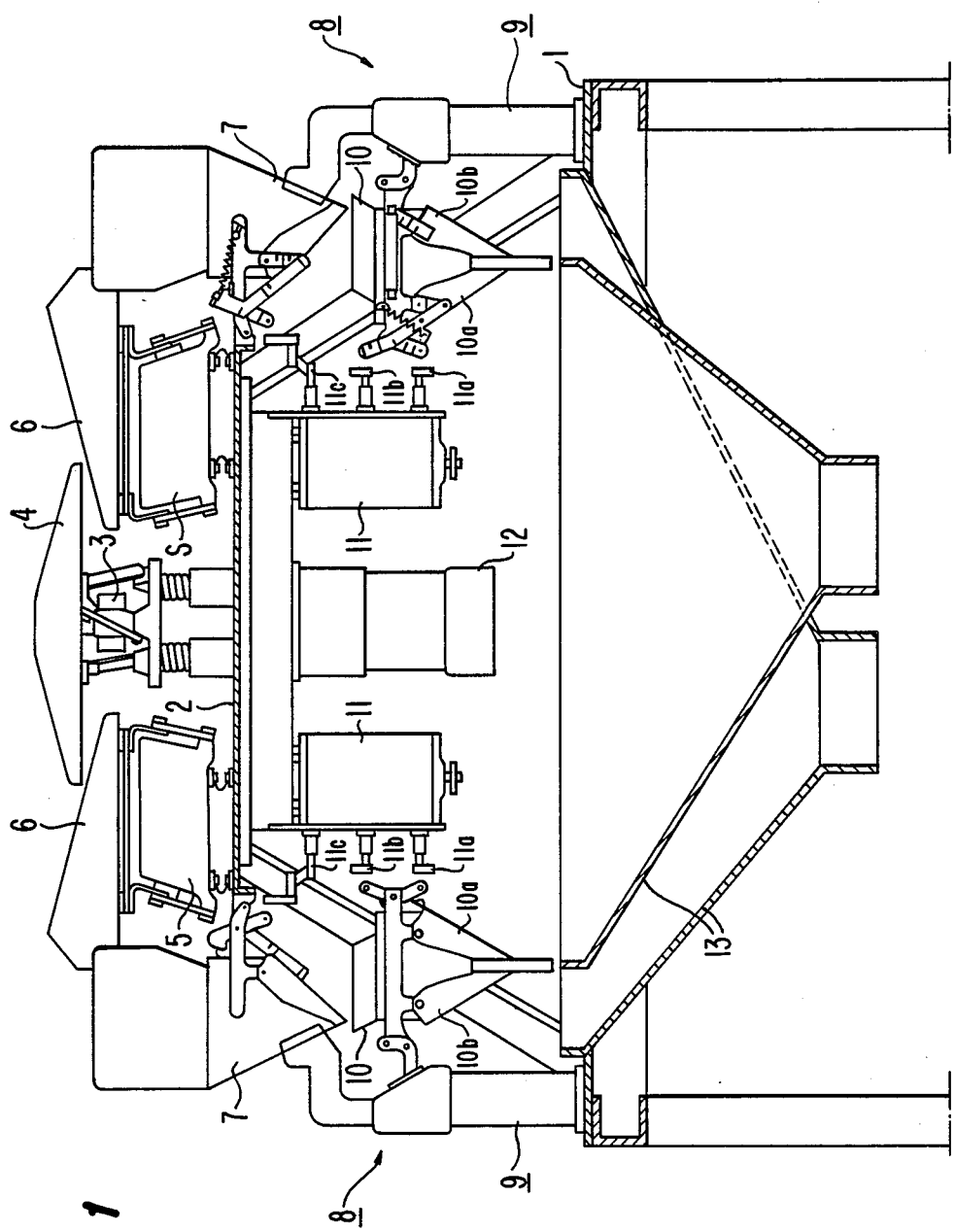
FIG. 1 is a partial cross section elevational view of a combinatorial weighing apparatus according to an embodiment of the present invention.
Figure 2:
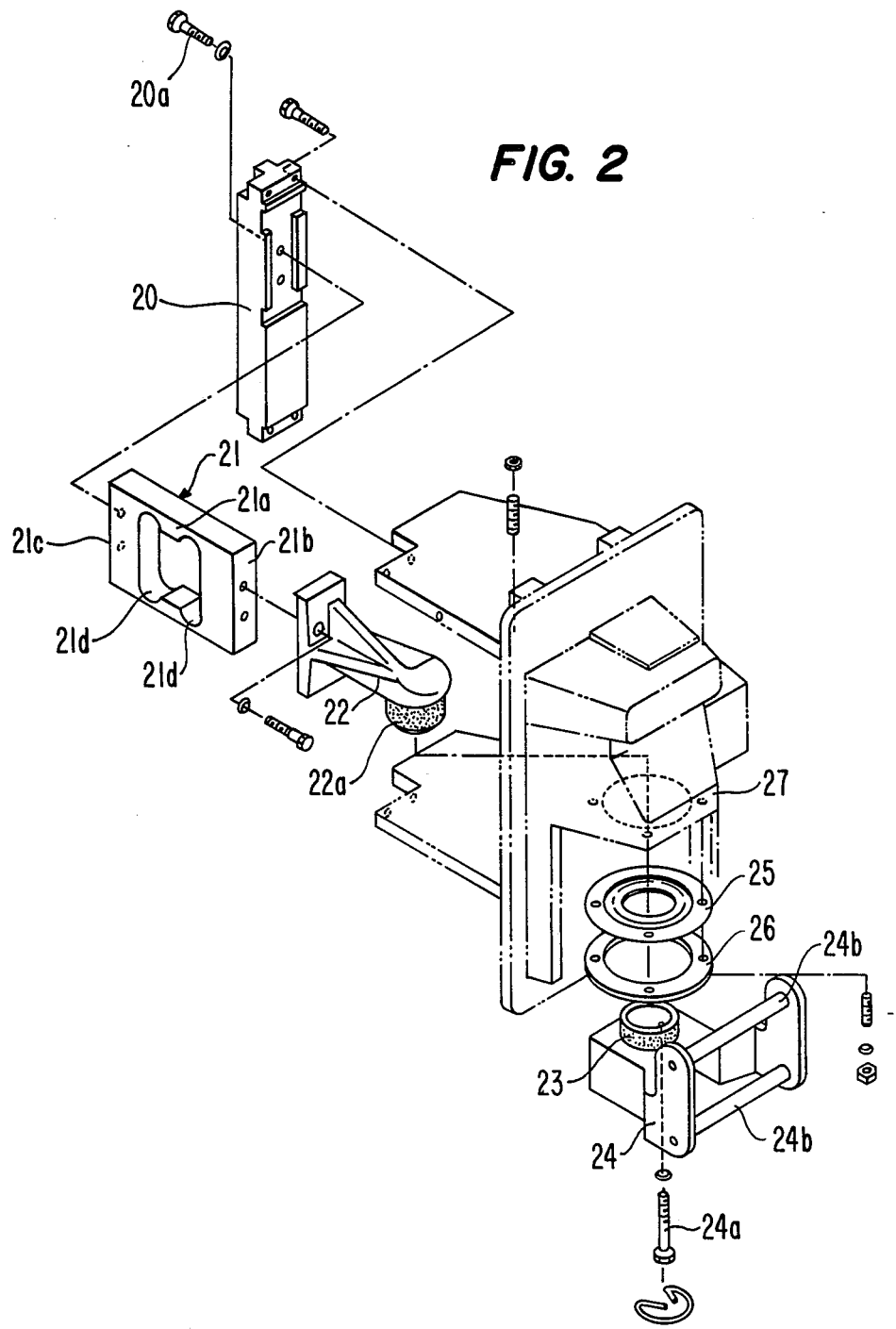
FIG. 2 is an exploded perspective view of components of a weighing mechanism in the combinatorial weighing apparatus shown in FIG. 1.
Figure 3:
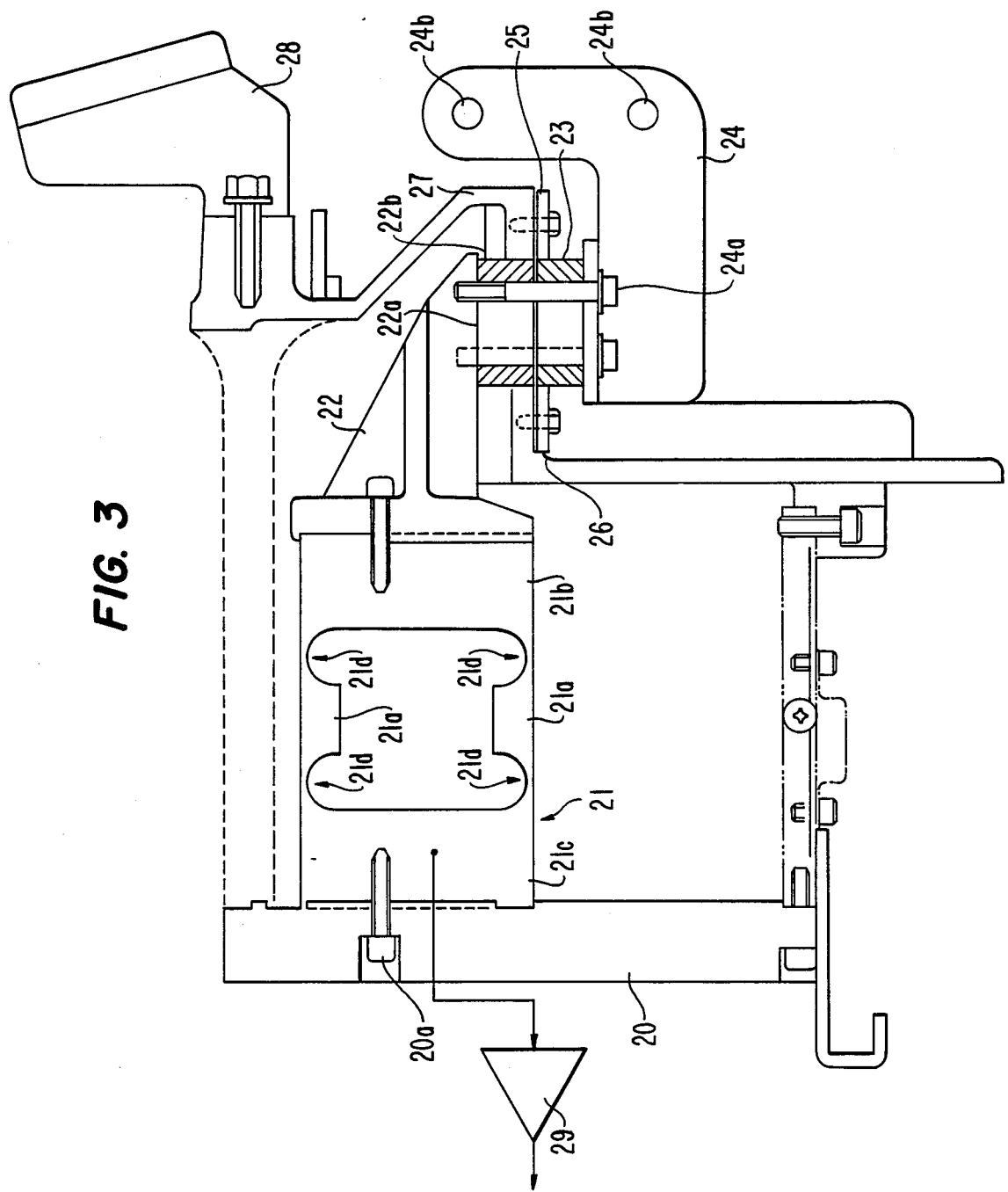
FIG. 3 is a cross-sectional view of the weighing mechanism in FIG. 2.

FIGS. 1 through 3 are weighing apparatus according to a first embodiment of the present invention. FIG. 1 is an overall structure of the weighing apparatus. The weighing apparatus includes a base 1 on which a support table 2 is mounted. A distribution table 4 is supported on the support table 2 by a vibrator 3. A plurality of supply troughs 6 are radially disposed on the support table 2 around the distribution table 4 by means of respective vibrators 5. As many pool hoppers 7 as supply troughs 6 are attached to the outer peripheral edge of the support table 2 at the radially outer ends of the supply troughs 6. A plurality of weighing machines 8 are supported on the base 1 in a circular pattern in alignment with the supply troughs 6 or the pool hoppers 7, respectively. The weighing machines 8 comprise bodies 9 and metallic weighing hoppers 10 mounted on the bodies 9, respectively, the weighing hoppers 10 being positioned respectively below the pool hoppers 7.

As many gate opening/closing devices 11 as the pool hoppers 7 or the weighing hoppers 10 are disposed respectively therebelow are suspended from the lower surface of the support table 2. In response to an article discharge command, the gate opening/closing devices 11 are operable by a motor 12 mounted the lower surface of the support table 2 for projecting pressers 11a, 11b, 11c to open gates of the weighing hoppers 10 and the pool hoppers 7 which are positioned laterally of the gate opening/closing devices 11. The weighing hoppers 10 have inwardly openable gates 10a and outwardly openable gates 10b. A pair of collection chutes 13 are disposed below the weighing hoppers 10, providing two article collection passages for receiving articles discharged from the gates 10a and 10b, respectively.

Articles supplied from the pool hoppers 7 are weighed by the weighing machines 8, and a weight combination which is the same as or closest to a given weight is selected to discharge those articles which give such a selected weight combination.

FIG. 2 is a perspective view of main components of a weighing mechanism in each of the weighing machines 8. FIG. 3 is a cross section of the main components shown in FIG. 2.

As illustrated in FIGS. 2 and 3, a load cell 21 is fastened to a support post 20 mounted on the body 9 by means of bolts 20a. The load cell 21 comprises upper and lower beams 21a, a movable end 21b to which a bracket 22 is screwed, and a fixed end 21c fixed to the support post 20. The upper and lower beams 21 have two pairs of flexible portions 21d to which strain gages electrically connected as a bridge are respectively attached. A weak weight signal generated by the strain gages is amplified by an amplifier having semiconductor devices, such as an operational amplifier, for weighing articles supplied to the weighing hopper 10.

The bracket 22 which is screwed to the load cell 21 has, on its end remote from the load cell 21, a cylindrical portion 22a extending therefrom and made of the same metal as the bracket 22. A metallic weighing hopper attachment arm 24 is fastened to the cylindrical portion 22a by means of bolts 24a extending through bolt holes in the cylindrical portion 22a, with a hollow cylindrical spacer 23 disposed around the cylindrical portion 22a and against the attachment arm 24. A thick circular tube 22b is fitted over the cylindrical portion 22a and disposed between the bracket 22 and the spacer 23. The spacer 23 and the tube 22b are made of a radio wave inhibiting material such as ferrite having high magnetic permeability. Where a conductor which passes an electric current of a high frequency is disposed in a ferrite material, the magnetic material of high magnetic permeability increases reactance with respect to the high-frequency current through the conductor to resist the passage of the high-frequency current.

The weighing hopper attachment arm 24 has two vertically spaced horizontal bars 24b by which the metallic weighing hopper 10 is mounted. The load cell 21 and the weighing hopper 10 are therefore electrically connected through the bracket 22, the bolts 24a, and the weighing hopper attachment arm 24.

A diaphragm 25 having a plurality of concentric wrinkles and a thin ring-shaped diaphragm base 26 are fitted over a lower region of the cylindrical portion 22a and attached to a frame 27 of the body 9. A pool hopper support 28 is attached to an upper portion of the frame 27 and supports the pool hopper 7.

When the combinatorial weighing apparatus is placed in a position where extraneous radio waves have a high electric field intensity, each weighing hopper 10 serves as an antenna for the extraneous radio waves and induces a high-frequency voltage.

The induced high-frequency voltage produces a high-frequency current which tends to flow via the horizontal bars 24b of the attachment arm 24 and the bolts 24a into the bracket 22. Since the spacer 23 and the tube 22a, both of ferrite, are continuously disposed in surrounding relation to the bolts 24a, the reactance to the flowing current is large and the high-frequency current is prevented almost in its entirety from flowing through the bolts 24a.

Therefore, any high-frequency current produced by extraneous radio waves and tending to reach the load cell 21 through the bracket 22 is very small. This solves the problem of a weighing error which would otherwise be brought about by the extraneous radio waves. Moreover, since the weighing hopper 10 is kept at the same potential as the body 19 in a DC manner, i.e., is grounded, any weighing error which would otherwise be caused by an electrostatic charge is also prevented.

Denoted at 29 in FIG. 3 is an amplifier for amplifying a weight signal produced by the strain gages of the load cell 21 and sending the amplified signal to a combinatorial weighing unit (not shown) which combines various weight values from the load cells to obtain weight combinations. Usually, the amplifier 29 is in the form of an operational amplifier.

FIG. 4 is a table showing the results of a test conducted on the weighing apparatus of the invention and a weighing apparatus having no radio interference protection which were placed in an electromagnetic field. When a weighing apparatus with no radio interference protection was subjected to radio waves in a low-channel range of television broadcasting or a VHF range corresponding to a communication band for use between an airplane and a control tower, the weighing apparatus had a maximum display error of 2.4 g at 110 MHz because of electric resonance of the weighing hopper due to its outer profile. When the weighing apparatus of the invention was subjected to radio waves, it caused no weighing error since the radio wave inhibiting material of ferrite prevented a high-frequency current from flowing into the load cells.

FIG. 5 shows an electronic weighing apparatus 50 according to another embodiment of the present invention. The electronic weighing apparatus 50 has a display unit 51 and a weighing unit 53. The display unit 51 is vertically disposed on an end of a case 55 made of iron and has a liquid crystal display for displaying weight values and other information. The display unit 51 will not be described in detail as it has no direct bearing on the present invention.

The case 55 includes a metallic base plate 55a on which four height-adjustable downwardly extending studs 57 are mounted at four corners thereof. A weighing mechanism 59 is disposed substantially centrally in the case 55. The weighing mechanism 59 includes a support 60 vertically mounted on the base plate 55a, and a load cell 61 is attached to the support 60.

The load cell 61 comprises upper and lower beams 61a, a movable end 61b to which a metallic bracket 62 is screwed, and a fixed end 61c fixed to the support 60. The beams 61a have two pairs of flexible portions 61d to which strain gages are respectively electrically connected as a bridge. A weak weight signal generated by the strain gages is amplified by an amplifier (not shown) including semiconductor devices, such as an operational amplifier. The semiconductor devices weigh articles placed on the weighing unit 53.

A metallic support member 63 is fixed to the bracket 62. The support member 63 extends loosely through an upper plate 55b of the case 55 in the upward direction. The upper plate 55b has a central raised portion 55d of a trapezoidal cross section having a central hole 55c through which the support member 63 extends upwardly to a position above the case 55. A metallic scale plate 65 is fastened to the upper surface of the support member 63 by means of screws 67.

A ring-shaped radio wave inhibiting member 69 of ferrite having a high magnetic permeability is fitted over the support member 63 slightly above its end which is fixed to the bracket 62. The support member 63 (electric conductor) extends centrally through the radio wave inhibiting member 69 and has increased reactance with respect to a high-frequency current, due to the high-permeability ferrite material. The high-permeability ferrite material prevents a high-frequency current from flowing therethrough.

A diaphragm 71 disposed between the scale plate 65 and the case 55 serves to shut out dust and water which would otherwise enter the case 55.

When the electronic weighing apparatus is placed in a position where extraneous radio waves have a high electric field intensity, the scale plate 65 (or the support member 63 if the scale plate 65 is made of plastics) serves as an antenna for the extraneous radio waves and induces a high-frequency voltage.

The induced high-frequency voltage produces a high-frequency current which tends to flow from the support member 63 toward the load cell 61. Since the radio wave inhibiting member 69 of ferrite is disposed around the support member 63, the support member 63 has large reactance to the current, so that the high-frequency current is prevented almost in its entirety from flowing through the support member 63.

Therefore, any high-frequency current produced by extraneous radio waves and tending to reach the load cell 61 is very small. This solves the problem of a weighing error which would otherwise be brought about by the extraneous radio waves. Where the case 55 is made of plastics, the weighing mechanism 59 should be surrounded by a case in the form of a thin metallic plate with the support member 63 extending through the case.

According to a further modification, a thick tubular ferrite member may be disposed around a conventional metallic spacer.

Although certain preferred embodiments have been shown and described, it should be understood that many changes and modifications may be made therein without departing from the scope of the appended claims.

What we claim is:

1. A weighing apparatus for measuring the weight of an article, comprising:
    a load cell having strain generating means for detecting a weight signal indicative of the weight of the article;
    an amplifier, coupled to said load cell, for amplifying the weight signal from said load cell;
    an article holding member formed of a metallic material and coupled to said load cell; and
    a radio wave inhibiting member made of a magnetic material having a high magnetic permeability and disposed continuously around a region where said load cell and said article holding member are coupled to each other.

2. A weighing apparatus according to claim 1, further including a plurality of load cells and a plurality of article holding members coupled to said load cells, and wherein said weighing apparatus comprising a combinatorial weighing apparatus.

3. A weighing apparatus according to claim 2, wherein said load cells output weight signals and further comprising means, coupled to said load cells, for combining weight signals from said load cells to produce a weight combination.

4. A weighing apparatus according to claim 3, wherein said load cells are arranged in a circular pattern.

5. A weighing apparatus according to claim 1, further including a display unit, coupled to said load cells, for displaying the weight detected by said load cell, wherein said article holding member comprises a scale plate and wherein said weighing apparatus comprising an electronic weighing apparatus.

6. A weighing apparatus according to claim 1, wherein said radio wave inhibiting member comprises ferrite.

* * * * *